March 13, 1934.     C. A. HEISTERKAMP     1,950,448
FLEXIBLE COUPLING
Filed Dec. 14, 1929
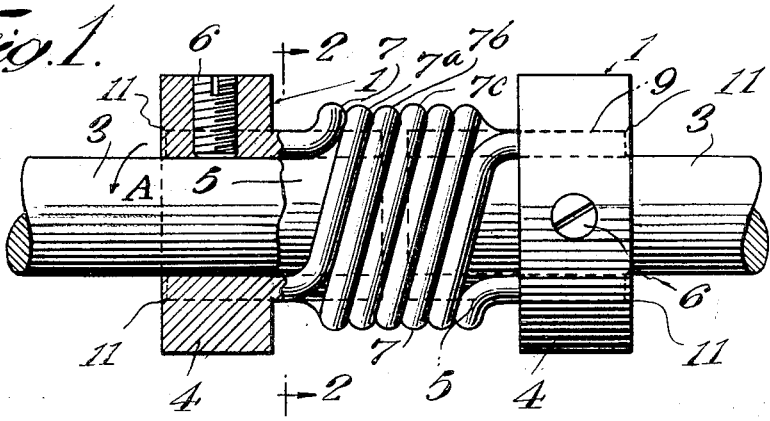
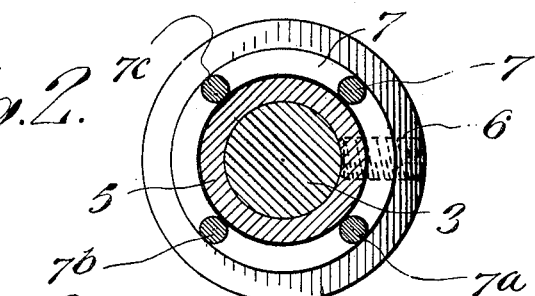
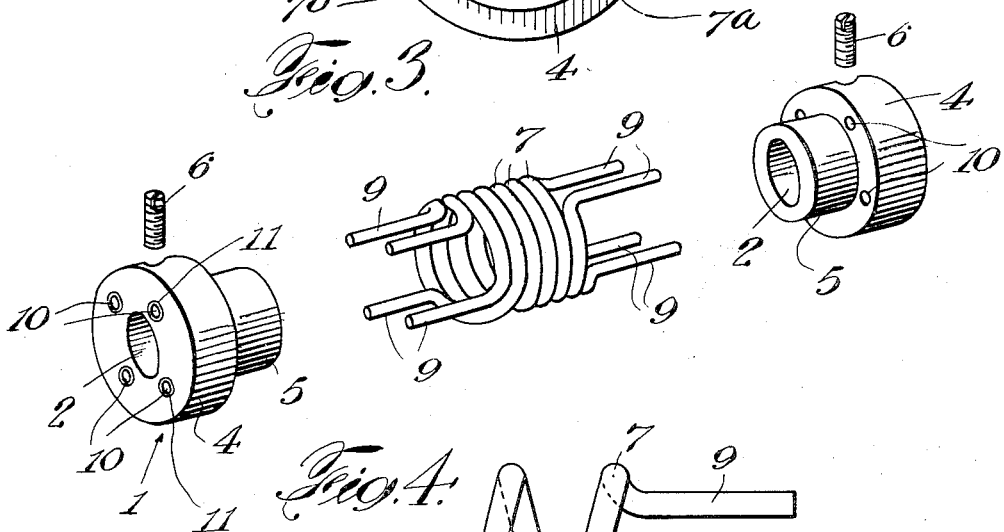
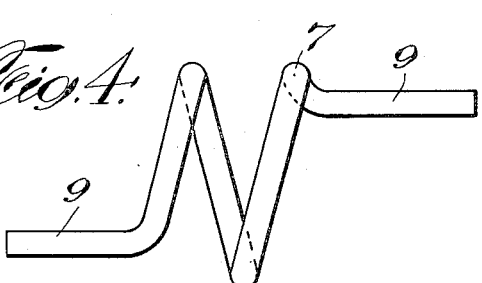
INVENTOR
Charles A. Heisterkamp
BY
Norman ʇ Holland
his ATTORNEY Patented Mar. 13, 1934

1,950,448

UNITED STATES PATENT OFFICE 1,950,448

FLEXIBLE COUPLING

Charles A. Heisterkamp, Hoboken, N. J.

Application December 14, 1929, Serial No. 413,972

5 Claims. (Cl. 64—96)

The present invention relates to shaft couplings and more particularly to a flexible coupling.

There are several types of flexible couplings on the market which are adapted to transmit relatively heavy loads between shaft members. These, however, due to their intricate construction and expensiveness, are not practical to be used for lighter loads. For smaller machines a circular section of leather collared at the ends and attached to a pair of shafts is commonly used. This type of coupling deteriorates rapidly due to the nature of leather and due to severe strains to which it is subjected. Sudden accelerations or overloads will frequently cause the leather to tear. This necessitates an interruption of the operation and the replacement of parts. Another leather construction used for small or medium sized units comprises a pair of intergripping leather discs bolted to a pair of hubs fastened to the shafts respectively. These are subject to the objections noted above. Flexible couplings now on the market which utilize spring members are intricate in construction and the manufacturing cost thereof prevents them from being sold at a reasonable price. Another disadvantage of such spring couplings is that the springs collapse when an overload is applied.

The present invention aims to eliminate or minimize the difficulties enumerated above by providing a flexible coupling which can be manufactured at a reduced cost and which is designed effectively to transmit loads varying over a wide range without collapsing or being affected otherwise. The wear is reduced to a minimum by the elimination of moving parts.

An object of the present invention is to provide an inexpensive, flexible coupling adapted to transmit a load effectively and efficiently from one shaft to another.

Another object of the invention is to provide a flexible coupling comprising intertwined reinforced spring members which will not collapse when sudden, momentary overloads are applied.

Another object of the invention is to provide a flexible coupling having a minimum number of parts, which can be readily assembled and which are rugged in construction and can withstand the rough usage to which they may be subjected.

Another object of the invention is to eliminate or minimize breakage of parts and interruptions in operation resulting therefrom.

A further object of the invention is to provide an inexpensive coupling particularly applicable for shafts transmitting relatively light loads.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a side elevational view partly in section, showing the coupling applied to a pair of rotatable shafts;

Fig. 2 is a sectional view taken along the line 2—2 on Fig. 1;

Fig. 3 is a perspective view of the parts about to be assembled; and

Fig. 4 is a side elevational view showing one of the four spring members in unassembled state.

Referring again to the drawing, there is shown a pair of hubs 1 having apertures 2 extending substantially through their center to receive a pair of rotatable shafts 3. The hubs comprise an annular section 4 of greater diameter than a second section 5, abutting the first section to form an annular shoulder. The utility of the shoulder will be described hereinafter. The hub members 1 are drilled radially and threaded to permit a suitable set screw 6 to be engaged to hold the hubs securely to the shafts 3.

The hubs 1 are coupled together by a series of helical spring members 7, 7a, 7b and 7c. The springs in the present or preferred embodiment comprise four spring members but any desired number preferably greater than two will achieve good results.

Fig. 4 serves to illustrate one spring member of the series of the invention. The ends of the spring are at 180 degrees to each other. In Fig. 3, a series of four springs 7, 7a, 7b and 7c are shown as they appear when they are assembled. The ends of the adjacent springs are at right angles to each other. By the above arrangement of the spring members, the internal strains are uniformly distributed throughout the entire coupling spring.

The ends 9 of the spring members 7 are retained in a corresponding series of apertures 10 passing through the portions 4 and 5 of the hub members. The springs may be fastened to the hubs by threading the ends 9 and applying a nut thereto or by riveting the ends to the hubs. A preferred method of securing the springs is to countersink the apertures 10 at 11 as shown in Fig. 1 and spinning the ends of the springs therein. When the ends are secured to the hubs in this manner, the outer faces of the hubs present a smooth surface which will not accumulate dirt or other foreign substances.

The apertures 10 are drilled at symmetrical points on the face of the hubs thereby equalizing tortional strains upon the hubs and the spring members. The shearing forces of the springs at the apertures are therefore balanced. The parts of the couplings will thus coordinate to distribute the load uniformly between the shafts. The radius of gyration will be zero and the center of gravity will be at the geometrical axis of the shaft and shearing forces at the shaft bearings will be greatly minimized. To further balance the shaft rotation the integral ends of the spring members are connected to the respective hubs at substantially 180 degrees to each other.

In forming the springs, a number of wires or rods of resilient metal, corresponding to the number of individual spring members, are twisted about a core. The spring members are so constructed that they engage each other snugly. The pitch of the springs depends upon the number of spring members desired, that is, for a spring of four segments, the pitch of each individual spring member would be four. The spring members of the present invention are twisted one and one half turns but if a longer spring section is desired, the number of turns may be increased. The springs may be made separately and then intertwined manually, but this method is less desirable due to the difficulty in assembling the members and the additional cost thereof. In making the springs, Monel metal is preferred as it is light, durable and not subject to corrosion. Brass, steel or other metal may also be used, if desired.

In operation the hubs are connected to the shafts 3 by means of the screws 6. While the coupling will rotate the shafts in either direction, preferably the normal rotation of the shafts is in the direction indicated by the arrows A. The springs connected between the hubs are then under compression, thus transmiting effectively the rotation to the driven shaft. The springs, due to their resiliency, compensate for imperfect alignment of the shafts and minimize the wear on the bearings. To prevent an excessive overload from causing the springs to collapse or become distorted the hubs 1 have been so constructed as to reinforce the springs. The projections 5 extend inwardly through the springs substantially to the central portion thereof. The outer diameter of the reduced portion 5 is slightly less than the inner diameter of the springs. Therefore, when an overload is applied between the shafts, the springs are drawn against the supporting shoulder. This reinforcement prevents the springs from collapsing under momentary excessive strains.

It will be seen that the present invention provides a flexible coupling which is adapted to transmit loads between shafts efficiently and which will accommodate a maximum overload during the operation thereof. When the springs are under compression, the coupling acts as a solid mass but retains its resiliency and is still able to cushion the load shocks and vibrations. The rugged construction of the parts permits them to be subjected to adverse conditions without the need of shut downs for replacement of worn out parts. The method of connecting the members symmetrically serves to balance the rotation of the shafts and to eliminate vibrations caused by not distributing the load uniformly throughout the coupling. Another advantage is that the diameter of the wires or rods used for making the spring members can be reduced to a minimum by reason of the reinforcing projections extending therethrough without reducing the strength of the coupling. The present embodiment of the invention is simple in construction and can be manufactured at less cost than known couplings.

As various changes may be made in the form, construction and arrangement of the parts in the above embodiment without departing from the spirit of the invention, it is to be understood that all matter herein is to be interpreted as illustrative and not in a limiting sense.

Having thus described my invention, I claim:

1. As an article of manufacture, a flexible coupling comprising a pair of shaft engaging members having extensions thereon, smaller in size than the normal portions thereof, said members having axially extending recesses therein adjacent the outer surface of said extensions, a plurality of intertwined springs telescoped over said extensions and having axially extending ends adapted to fit into said recesses to facilitate assembly of said springs and said members, the two ends of each spring being secured to said shaft engaging members at points substantially 180° apart.

2. As an article of manufacture, a flexible coupling comprising a pair of shaft engaging members having extensions thereon and also having axially extending recesses therein, four intertwined springs having axially extending end portions, said springs being telescoped over said extensions and having their ends fitting into recesses and secured to said members to facilitate assembly thereof, the two ends of each spring being secured to said shaft engaging members at points substantially 180 degrees aparts and the ends of adjacent springs being secured to said shaft engaging members at substantially 90 degrees apart.

3. As an article of manufacture, a flexible coupling comprising a pair of shaft engaging members having extensions thereon and also having axially extending recesses therein, four intertwined springs having axially extending end portions, the adjacent parts of the coils of each spring being spaced to receive snugly the three other springs so that the coils of adjacent springs frictionally engage each other to facilitate assembly of the four springs as a unit, said axially extending end portions fitting into said axially extending recesses in said members, the two ends of each spring being secured to said shaft engaging members at points substantially 180 degrees apart and the ends of adjacent springs being secured to said shaft engaging members at points substantially 90 degrees apart, said extensions on said members having a smaller diameter than the internal diameter of said springs to extend into and be spaced from said springs to permit the springs to carry normal loads and to reinforce said springs during abnormally heavy loads.

4. In a flexible coupling, the combination of a pair of hub members adapted to engage a pair of shafts and having axially extending recesses therein, a series of intertwined helical springs of circular cross-section having axially extending ends secured in the recesses of said hub members to facilitate assembly thereof, each of said hub members having a cylindrical portion fitting into said springs and extending substantially to the middle point thereof, said portions having a smaller diameter than the internal diameter of said springs, whereby said springs are normally spaced from said portion, said springs being constructed of substantially rigid material adapted to sustain normal loads alone and adapted to flex and engage the cylindrical portion when excessive loads are applied.

5. A flexible coupling comprising a series of intertwined helical springs adapted to be assembled as a unit, a pair of hub members adapted to fit over the ends of the shafts to be coupled, each of said hub members having a reduced portion adapted to be telescoped into said helical springs and also having apertures substantially ninety degrees apart extending longitudinally thereof adapted to receive the ends of said springs, the respective ends of said intertwined springs having longitudinally extending end portions fitting into said apertures, said helical springs being spaced slightly from the reduced portions of said hub members to render the latter ineffective with normal loads and effective with abnormal loads to prevent the collapse of said springs.

CHARLES A. HEISTERKAMP.